United States Patent [19]

Nolan et al.

[11] 4,025,432
[45] May 24, 1977

[54] FLOW CONTROL UNIT FOR MAGNETIC MATRIX

[75] Inventors: John J. Nolan, Cambridge; Peter G. Marston, Gloucester, both of Mass.

[73] Assignee: Sala Magnetics, Inc., Cambridge, Mass.

[22] Filed: July 25, 1975

[21] Appl. No.: 599,099

[52] U.S. Cl. .............................. 210/222; 55/100; 55/418; 138/42

[51] Int. Cl.² ........................................ B01D 35/06

[58] Field of Search .......... 209/231, 240, 232, 488, 209/497; 210/222, 223; 55/100, 418; 138/42; 259/4 R, 4 AB

[56] References Cited
UNITED STATES PATENTS

| | | | |
|---|---|---|---|
| 1,637,697 | 8/1927 | Jacobsen | 259/4 AB |
| 2,193,001 | 3/1940 | Ish-Shalom | 259/4 R |
| 3,410,531 | 11/1968 | Bukel | 259/4 R |
| 3,514,074 | 5/1970 | Self | 138/42 X |
| 3,633,751 | 1/1972 | Stevens | 210/222 |
| 3,770,629 | 11/1973 | Nolan | 210/222 X |
| 3,780,767 | 12/1973 | Borg | 138/42 X |
| 3,917,222 | 11/1975 | Kay | 138/42 X |

*Primary Examiner*—Bernard Nozick
*Attorney, Agent, or Firm*—Joseph S. Iandiorio

[57] ABSTRACT

A flow control unit for a magnetic matrix in a magnetic separator including at least one expander section, each expander section including a channel element having at least one port, a plurality of channels extending radially outwardly from each port and terminating in a plurality of first holes; and a spreader element including a plurality of second holes equal in number and aligned with the holes of the adjacent expander section, a plurality of ducts associated with each of the second holes and a plurality of passages, one interconnecting each of the ducts with a respective one of the second holes.

3 Claims, 19 Drawing Figures

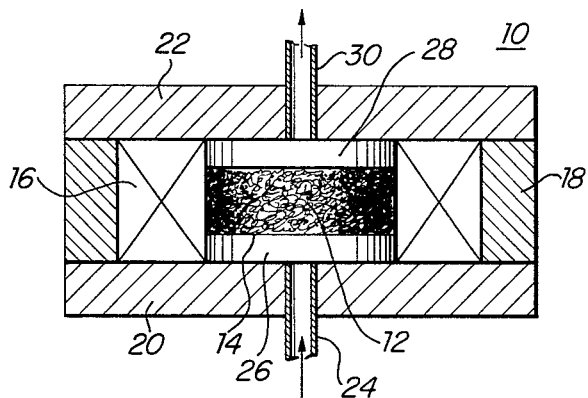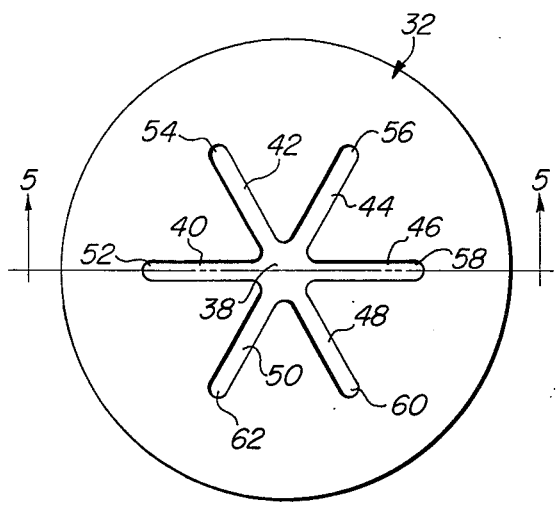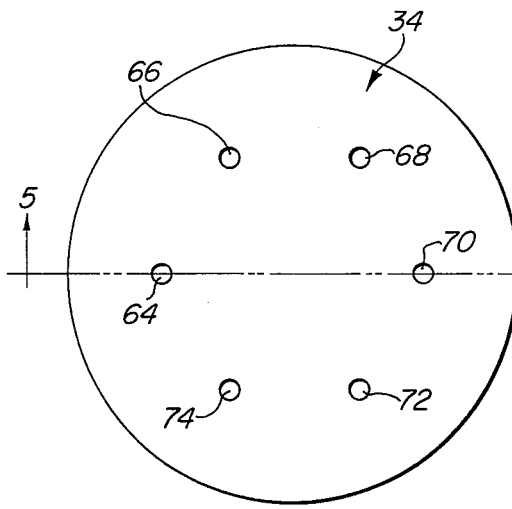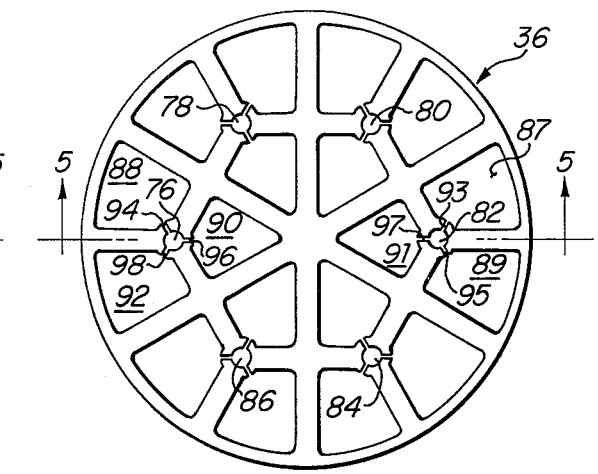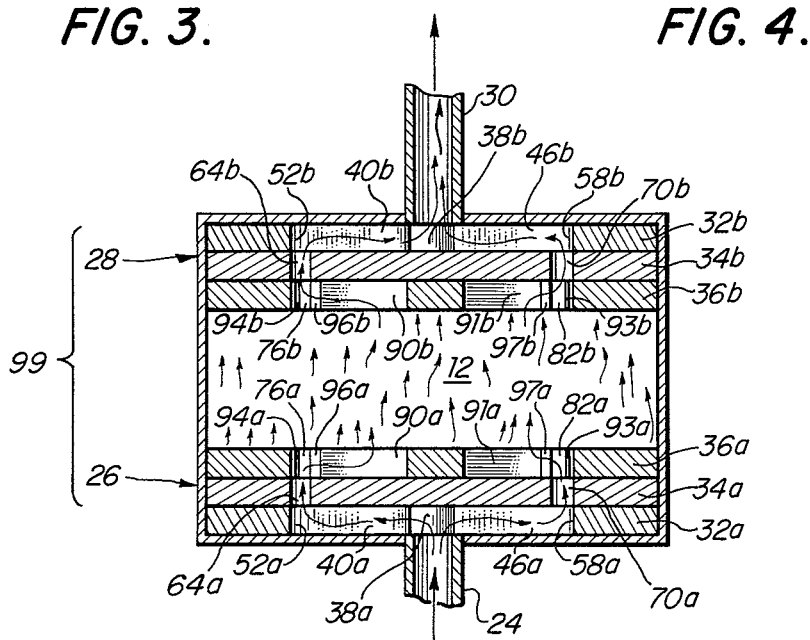

FLOW CONTROL UNIT FOR MAGNETIC MATRIX

FIELD OF INVENTION

This invention relates to a multi-element flow control unit for servicing a magnetic matrix in a magnetic separator.

BACKGROUND OF INVENTION

In one type of conventional magnetic separator, separation takes place in a magnetic matrix made of steel wool, expanded metal or similar material disposed in a canister. The canister is surrounded by an electromagnetic coil and the entire assembly is enclosed in a magnetic return frame. The magnetic field produced by the coil extends through the matrix in the same direction as the fluid flow. Feed is delivered at one end and the product of the separator is removed at the other end. There may be more than one matrix in the canister and each matrix may have more than one inlet and outlet.

An important consideration in such separators is that the matrix be delivered feed to be separated and the product of the separation be recovered in a manner to promote uniformity of the separation process: each unit area of the matrix should process the same amount of flow per unit time. This can be extremely difficult when, as is often the case, the matrix itself is not of uniform density and impedance to fluid flow. The problem is compounded by the use of only one or a few inlets and outlets per matrix, for that contributes to the non-uniformity of feed delivery and product recovery. Enlarging the space between the end of an inlet or outlet pipe and the matrix to create a reservoir of feed or product to improve uniformity unfortunately also may considerably reduce flow velocity and result in settling. In addition, increasing that space increases the corresponding dimension of the return frame, a substantial factor in separator cost, and increases the length of the air/fluid gap in the magnetic field thereby reducing the magnetic circuit efficiency. Often the input and output apparatus for such a magnetic separator is made integral with and often is a machined portion of the canister and/or frame, and must be tailored to meet the mechanical and hydraulic conditions associated with each matrix served.

SUMMARY OF INVENTION

It is therefore an object of this invention to provide an improved, simple and relatively inexpensive flow control unit for a matrix of a magnetic separator.

It is a further object of this invention to provide such a flow control unit which is modular and can be used either as a distributor of feed or collector of product.

It is a further object of this invention to provide such a flow control unit which is formed of a number of simple elements which are easy to make and assemble.

It is a further object of this invention to provide such a flow control unit which can be supplied in identical form to service each matrix in a multiple matrix magnetic separator.

It is a further object of this invention to provide such a flow control unit which provides uniform flow in the matrix.

It is a further object of this invention to provide such a flow control unit which requires a minimum of space alongside each matrix regardless of the number of inlets and outlets served while providing uniform flow velocity and preventing settling.

The invention features a flow control unit for a magnetic matrix in a magnetic separator. Each flow control unit includes at least one expander section and one spreader element. Each expander section includes a channel element having at least one port and a plurality of channels extending radially outwardly from each of the ports and terminating in a plurality of first holes. Each spreader element includes a plurality of second holes equal in number and aligned with the holes of the adjacent expander section. A plurality of ducts is associated with each of the second holes and a plurality of passages, one interconnecting each of the ducts with a respective one of the second holes.

In some constructions the expander section may include a restrictor element including a plurality of third holes equal in number and aligned with the first holes for interfacing between its own channel element and the next successive channel element or in lieu thereof a spreader element. In another alternative embodiment the spreader element may include a plurality of holes in which each of the holes is smaller at the end proximate an expander section than at its other end.

DISCLOSURE OF PREFERRED EMBODIMENT

Other objects, features and advantages will occur from the following description of a preferred embodiment and the accompanying drawings, in which:

FIG. 1 is a schematic, sectional diagram of a magnetic separator with flow control units shown unsectioned according to this invention;

FIG. 2 is a plan diagrammatic view of a channel element used in the flow control unit of FIG. 1;

FIG. 3 is a plan diagrammatic view of a restrictor element used in the flow control unit of FIG. 1;

FIG. 4 is a schematic plan diagrammatic view of a spreader element used in the flow control unit of FIG. 1;

FIG. 5 is a schematic, cross-sectional diagram of a canister containing a single matrix and two flow control units acting as a feed distributor and a product collector according to this invention;

Figure 6:
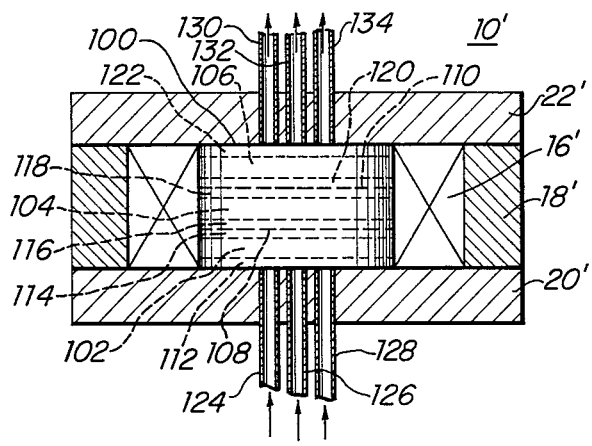
FIG. 6 is a schematic, cross-sectional diagram with the canister shown unsectioned of a multiple matrix magnetic separator employing flow control units according to this invention as distributors and collectors.
Figure 7:
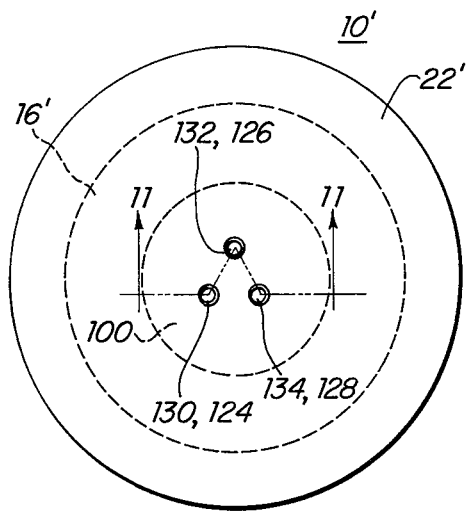
FIG. 7 is a diagrammatic plan view of the separator of FIG. 6.
Figure 8:
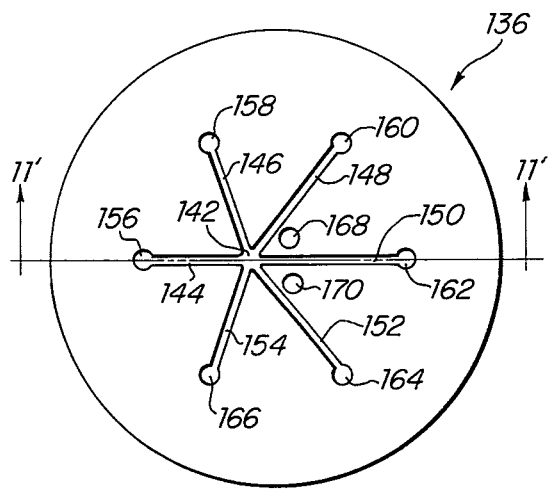
FIG. 8 is a diagrammatic plan view of a channel element for use in the flow control units in the multiple matrix device shown in FIG. 6.
Figure 9:
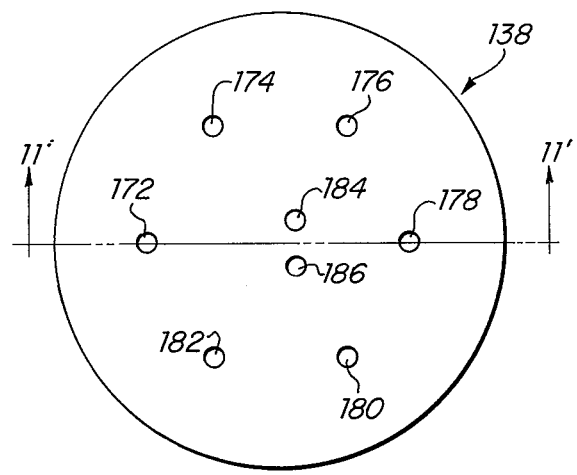
FIG. 9 is a diagrammatic plan view of a restrictor element for use in the flow control units in the multiple matrix separator of FIG. 6.
Figure 10:
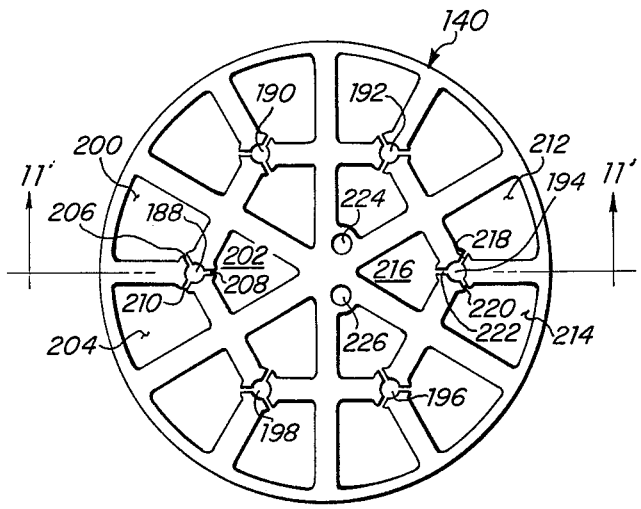
FIG. 10 is a diagrammatic plan view of a spreader element for use in the flow control units in the magnetic separator of FIG. 6.
Figure 11:
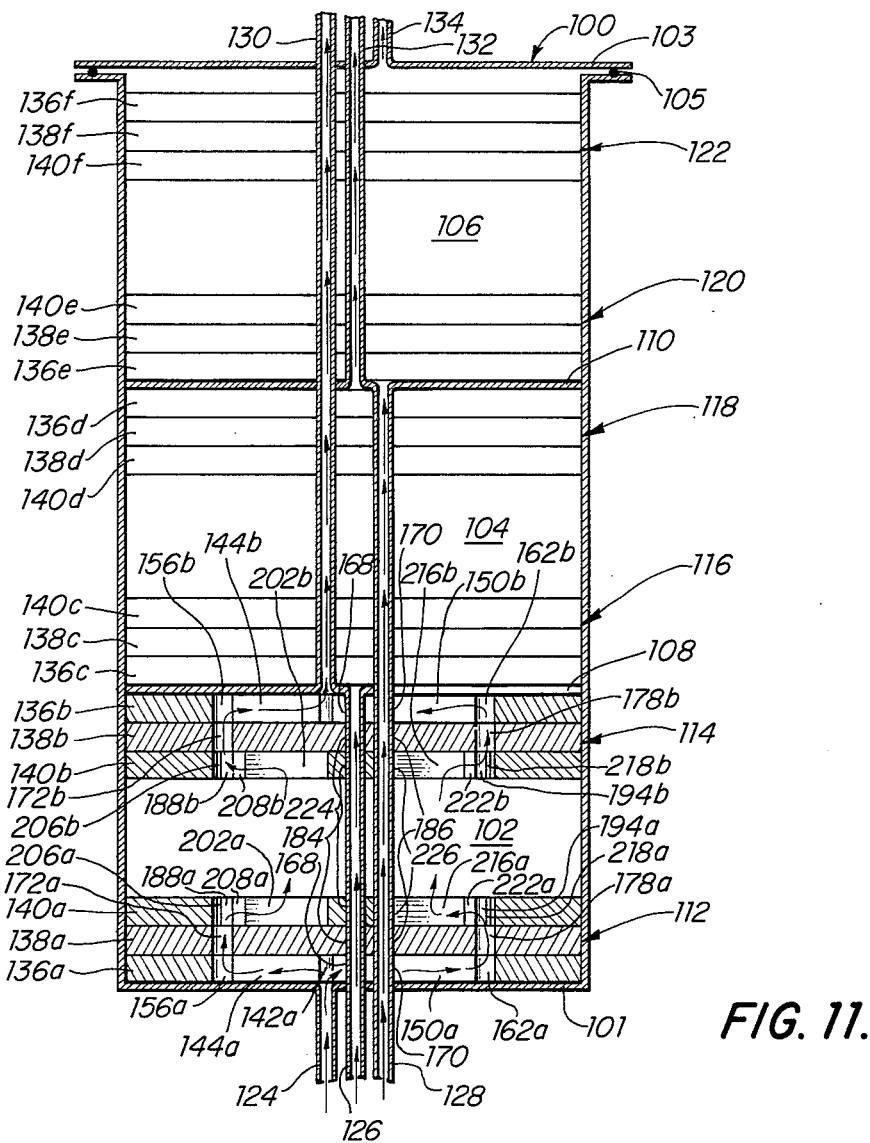
Figure 12A:
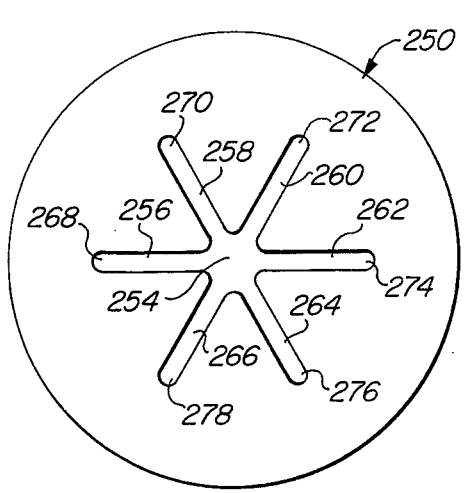
Figure 12B:
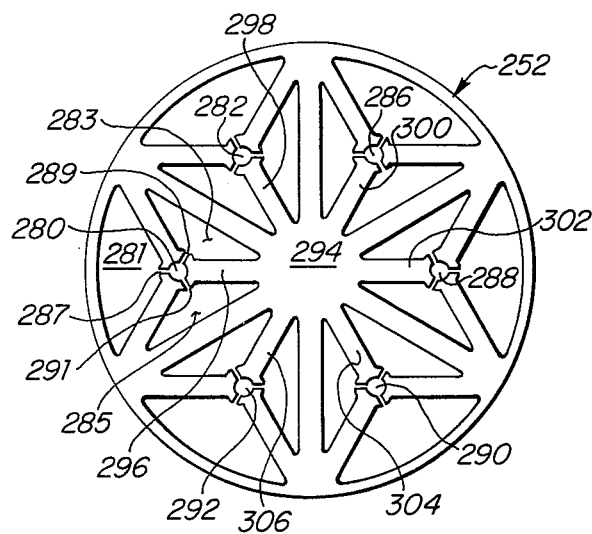
Figure 13:
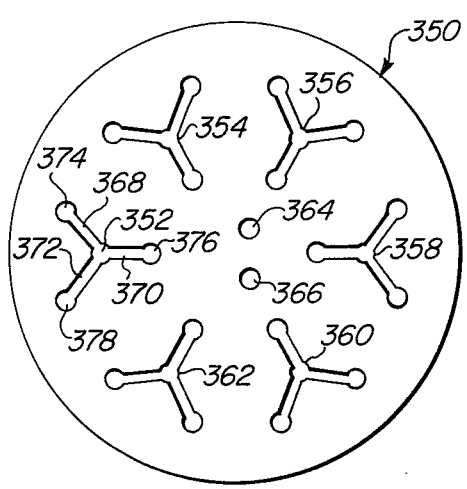
Figure 14:
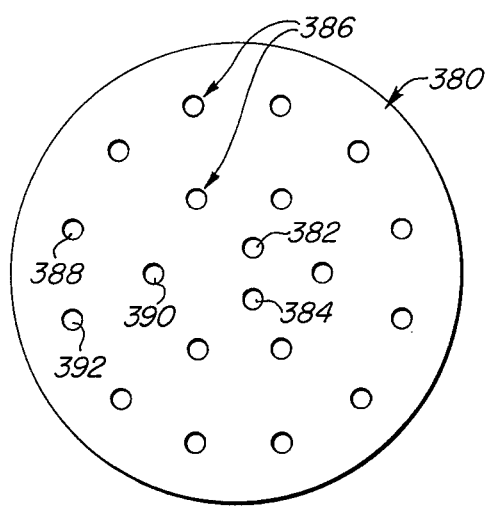
Figure 15:
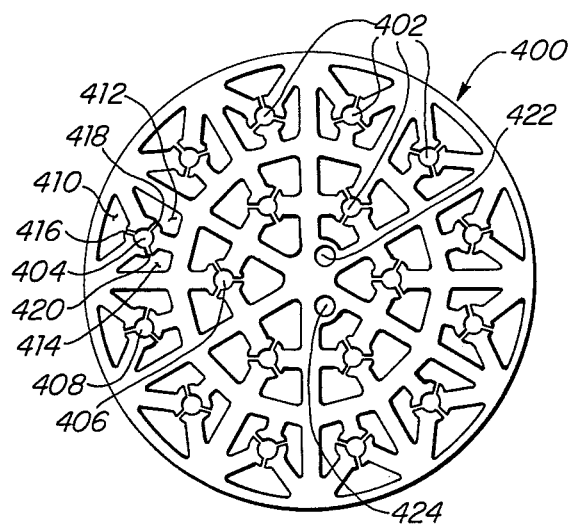
Figure 16:
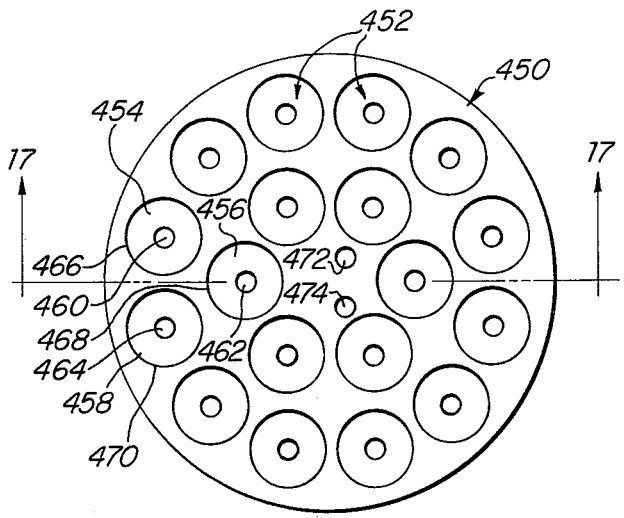
Figure 17:
Figure 18:
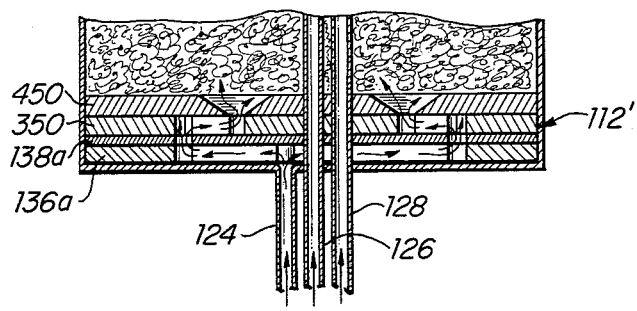

FIG. 11 is a schematic, sectional diagram of the canister, matrices, inlets and outlets shown in FIG. 6 taken along lines 11—11 of FIG. 7 superimposed on the matrices and flow control units with one matrix and the associated flow control assembly, including two flow control units shown in detail with the channel element, restrictor element and spreader element sectioned along lines 11'—11' in FIGS. 8, 9 and 10;

FIGS. 12A and 12B are diagrammatic plan views of an alternative channel element and an alternative spreader element, respectively, which can be combined to form a flow control unit without a restrictor element;

FIG. 13 is a diagrammatic plan view of an additional channel element according to this invention;

FIG. 14 is a diagrammatic plan view of an additional restrictor element according to this invention;

FIG. 15 is a diagrammatic plan view of an additional spreader element according to this invention;

FIG. 16 is a diagrammatic plan view of an alternative type of spreader element according to this invention;

FIG. 17 is a schematic, cross-sectional diagram taken along line 17—17 of FIG. 16; and FIG. 18 is a schematic, cross-sectional diagram of a portion of a matrix including a flow control unit which uses a spreader element such as shown in FIG. 16.

There is shown in FIG. 1 a magnetic separator 10 including a magnetic matrix 12 enclosed in a canister 14 surrounded by an electromagnetic coil 16 which is surrounded by annular magnetic return frame 18 and covered on bottom and top by magnetic plates 20 and 22. Feed is delivered to matrix 12 by inlet 24 through flow control unit 26 acting as a distributor and the separation product is delivered to outlet 30 by flow control unit 28 acting as a collector.

Each flow control unit 26 and 28 includes an expander section including channel element 32, FIG. 2, and restrictor element 34, FIG. 3; in combination with spreader element 36, FIG. 4. Channel element 32 includes a central aperture 38 for engaging with inlet 24 and/or outlet 30 and six channels 40, 42, 44, 46, 48 and 50 which terminate in six holes 52, 54, 56, 58, 60 and 62.

Restrictor element 34, FIG. 3, includes an equal number of holes 64, 66, 68, 70, 72 and 74 which when assembled as an expander section in a flow control unit are aligned with holes 52, 54, 56, 58, 60 and 62, respectively, in channel element 32.

The spreader element 36, FIG. 4, includes a third plurality of holes 76, 78, 80, 82, 84 and 86. Each of which has associated with it three ducts as illustrated with respect to hole 76 which supplies three ducts 88, 90 and 92 to which it is interconnected by passages 94, 96 and 98, respectively, and hole 82 which interconnects with ducts 87, 89 and 91 through passages 93, 95 and 97, respectively. The size of the various channels, holes, passages and ducts in spreader element 36, restrictor element 34 and channel element 32 is a function of the flow rate desired and the nature and quality of the matrix. For example, if the matrix is not uniform in density and impedance, passages 94, 96, 98, 93, 95 and 97 may be made extremely small to create high impedance so that a uniform flow velocity is produced through the matrix.

A first flow control unit, flow control unit 26, FIG. 5, consists of a channel element 32a, restrictor element 34a, and spreader element 36a each of which is identical in all respects to the channel element 32, restrictor element 34 and spreader element 36 shown in FIGS. 2, 3, and 4, respectively. Like parts of the channel elements, restrictor elements and spreader elements in flow control units 26, 28 in FIG. 5 have been given like numbers accompanied by lower case a or b, respectively, with reference to the description of those elements 32, 34 and 36 in FIGS. 2, 3 and 4. The second flow control unit, flow control unit 28, includes channel element 32b, restrictor element 34b, and spreader element 36b assembled in the inverse sequence with respect to flow control unit 26. Flow control unit 26 acts as a distributor to distribute the feed from inlet 24 to matrix 12 and flow control unit 28 acts as a collector to collect the product from matrix 12 and deliver it to outlet 30. Flow control units 26 and 28 together constitute a flow control assembly: flow control assembly 99 associated with matrix 12.

A multiple matrix separator 10', FIG. 6, wherein like parts have been given like numbers primed with respect to FIG. 1 includes a canister 100 including three matrices 102, 104 and 106 separated by partitions 108 and 110. Each of matrices 102, 104 and 106 has associated with it a flow control assembly including two flow control units 112, 114; 116, 118; and 120, 122, respectively. Canister 100 is surrounded by coil 16' which in turn is surrounded by annular magnetic frame 18' and covered on bottom and top by plates 20' and 22'. There are three inlets 124, 126 and 128 and three outlets 130, 132 and 134. Each matrix is served by one inlet and one outlet. Matrix 102 is served by inlet 124 and outlet 130; matrix 104 is served by inlet 126 and outlet 132; and matrix 106 is served by inlet 128 and outlet 134. The cylindrical nature of separator 10' may be seen from the plan view in FIG. 7.

Each flow control unit 112, 114, 116, 118, 120 and 122 in FIG. 6 includes a channel element 136, FIG. 8, a restrictor element 138, FIG. 9, and a spreader element 140, FIG. 10. Channel element 136 includes a central port 142 with a plurality of radially extending channels 144, 146, 148, 150, 152 and 154, each of which terminates in a hole 156, 158, 160, 162, 164 and 166. Port 142 is slightly off center and the pattern of the channels is somewhat less than perfectly symmetrical in order to accommodate two other holes 168 and 170 which must accommodate two of the inlets and outlets other than those communicating with port 142.

Restrictor element 138 similarly includes six holes 172, 174, 176, 178, 180 and 182 aligned with holes 156, 158, 160, 162, 164 and 166, respectively, and two additional holes 184, 186 aligned with holes 168 and 170, respectively, for accommodating the two of the inlets or outlets which are not serving this particular distributor or collector.

Spreader 140, FIG. 10, similarly has six holes 188, 190, 192, 194, 196 and 198 each of which serves three ducts through three passages as exemplified by hole 188 serving ducts 200, 202 and 204 through passages 206, 208, 210 and hole 194 which serves ducts 212, 214 and 216 through passages 218, 220 and 222. Spreader element 140 also includes two through-holes 224 and 226 corresponding to through-holes 184, 186 in restrictor element 138 and two through-holes 168 and 170 in channel element 136, FIG. 8. Channel element 136, restrictor element 138 and spreader element 140 are shown assembled in FIG. 11 where these elements have been designated with the same reference numerals accompanied by a lower case a, b, c, d, e, and f in flow control units 112, 114, 116, 118, 120 and 122, respectively. Canister 100 includes vessel 101 and cover 103 sealingly engaged with vessel 101 by seal 105.

The modularity of the flow control units according to this invention can be understood with respect to FIG. 11 as follows. With flow control units 112 and 114 associated with matrix 102, holes 168, 184 and 224 and holes 170, 186, 226 each in their respective channel, restrictor and spreader elements accommodate inlets 126 and 128, respectively. However, in flow control units 116 and 118 these same holes 168, 184, 224 and 170, 186, 226 may be made to accommodate inlet 128 and outlet 130 simply by rotating the elements of those units 120°. Similarly with respect to flow control units 120 and 122 associated with matrix 106 an additional rotation of 120° in the same direction enables the same holes 168, 184, 224 and 170, 186, 226 to accommodate outlets 130 and 132, respectively.

Preferably each channel element, restrictor element and spreader element is made of ferromagnetic plate material. However, in small separators, or separators in which high magnetic efficiency is not crucial, these elements may be made of non-ferromagnetic material. For example, in one device they are made of closed cell foam neoprene.

Although thus far each flow control unit discussed has included a restrictor element in its expander section this is not a necessary limitation of the invention. Restrictor elements are only necessary when the channels or the holes in the channel element will interfere or cross i.e. communicate with, holes or ducts in the spreader with which they should not communicate. For example, in FIG. 12A there is shown a channel element 250 which when used with the spreader element 252 of FIG. 12B forms a flow control unit which needs no restrictor element. Channel element 250, FIG. 12A, includes a central aperture 254 which serves six channels 256, 258, 260, 262, 264 and 266 each of which terminates in a hole 268, 270, 272, 274, 276 and 278, respectively.

Spreader element 252 also includes six holes 280, 282, 286, 288, 290 and 292 which align with the holes on channel element 250. Associated with each of these holes are three ducts as illustrated with respect to hole 280 that has associated with it ducts 281, 283, 285 interconnected with hole 280 by means of passages 287, 289 and 291, respectively. The construction of spreader 252 is such that the central land 294 directly overlays and covers port 254 of channel element 250, FIG. 12A and lands 296, 298, 300, 302, 304 and 306 directly overlay and cover channels 256, 258, 260, 262, 264 and 266, respectively, so that no restrictor element is needed between them to ensure isolation.

Although thus far each flow control unit has been illustrated as utilizing only one expander section, e.g. one channel element and one restrictor element or just one channel element to feed a particular spreader element, this is not a necessary limitation of the invention as there may be two or more expander sections, each including such a channel element and restrictor element, for each flow control unit. Restrictor elements may be eliminated if they are not needed for isolation. Such an additional channel element 350 is shown in FIG. 13 including six additional holes 352, 354, 356, 358, 360 and 362 which align with the corresponding holes on restrictor element 138, FIG. 9. There are also holes 364 and 366, which align with holes 184 and 186 on restrictor element 138 and function to accommodate the inlets and outlets. Each of holes 352, 354, 356, 358, 360 and 362 has associated with it three channels as illustrated with respect to hole 352 which serves channels 368, 370 and 372 which terminate in holes 374, 376 and 378, respectively.

Adjacent second channel element 350, is a second restrictor element 380, FIG. 14, which, in addition to the two holes 382 and 384 that correspond to holes 364 and 366 on channel element 350, includes eighteen additional holes 386, each one of which corresponds to a particular one of the three holes that are serviced by each of the six holes 352, 354, 356, 358, 360 and 362 in channel element 350, as exemplified by holes 388, 390 and 392 which correspond to holes 374, 376 and 378 on channel element 350.

Spreader element 400 FIG. 15, which is stacked adjacent restrictor element 380 also includes eighteen holes 402 which align with the holes 386 of restrictor element 380 exemplified by holes 404, 406 and 408 of spreader element 400 which align with holes 388, 390 and 392 of restrictor element 380. Each such hole, as exemplified by hole 404, has associated with it three ducts 410, 412 and 414 with which it is interconnected by passages 416, 418, and 420. Spreader element 400 also includes holes 422 and 424 which align with holes 382 and 384 to accommodate the inlets and outlets.

Although thus far in the description of the spreader elements they have been illustrated primarily as two dimensional ducts this is not a necessary limitation on the spreader element structure. For example, a spreader element may be stacked immediately adjacent channel element 350 without the need for a restrictor element 380 or any other restrictor element. Spreader element 450, FIG. 16, includes eighteen holes 452 having a smaller opening at the end adjacent channel element 350 and a larger opening at the other end as exemplified by holes 454, 456 and 458 which have small diameter openings 460, 462 and 464 to be located adjacent channel element 350 and larger openings 466, 468 and 470 at their other ends. Holes 472 and 474 correspond to holes 364 and 366 in channel element 350.

The tapered conical shape of holes 452 can be seen with respect to FIG. 17 where hole 456 is shown in profile.

Spreader elements similar to spreader element 450, FIG. 16, may be used in any of the flow control units such as illustrated in FIG. 5 and FIG. 11. For example, flow control unit 112, FIG. 11, may be modified to include spreader element 450 as shown in FIG. 18 where like parts have been given like numbers and similar parts like numbers primed with respect to FIGS. 11, 13 and 16. In FIG. 18 flow control unit 112' includes channel element 136a and restrictor element 138a which constitute a first expander section. Spreader 140a has been eliminated and replaced by spreader element 450, FIG. 16, and a second expander section constituted solely by channel element 350, FIG. 13, has been inserted between restrictor element 138a and spreader element 450.

Other embodiments will occur to those skilled in the art and are within the following claims:

What is claimed is:
1. A flow control unit for a magnetic matrix in a magnetic separator comprising:
 at least one expander section, each said expander section including a channel element having at least one port, and a plurality of channels extending radially outwardly from each said port and terminating in a plurality of first holes; and
 a spreader element including a plurality of second holes equal in number and aligned with said holes of the adjacent said expander section, a plurality of ducts associated with each of said second holes and a plurality of passages, one interconnecting each of said ducts with its respective one of said second holes.

2. The flow control unit of claim 1 in which said expander section includes a restrictor element including a plurality of holes equal in number and aligned with said first holes.

3. A flow control assembly for a magnetic separator including at least one matrix, each matrix being served by at least one inlet and one outlet comprising:
- a distributor and a collector associated with each matrix in said separator; each said distributor and said collector including a flow control unit including:
- at least one expander section, each said expander section including a channel element having at least one port, and a plurality of channels extending radially outwardly from each said port and terminating in a plurality of first holes; and
- a spreader element including a plurality of second holes equal in number and aligned with said holes of the adjacent said expander section, a plurality of ducts associated with each of said second holes and a plurality of passages, one interconnecting each of said ducts with its respective one of said second holes;
- a said channel element in said distributor and a said channel element in said collector each having a number of said ports equal in number to the number of inlets and outlets per matrix, respectively.

* * * * *